United States Patent [19]
Ishino

[11] Patent Number: 5,804,122
[45] Date of Patent: Sep. 8, 1998

[54] METHOD OF PRODUCING COMPOSITE INSULATOR

[75] Inventor: Shigeo Ishino, Niwa-Gun, Japan

[73] Assignee: NGK Insulators, Ltd., Japan

[21] Appl. No.: 806,401

[22] Filed: Feb. 26, 1997

[30] Foreign Application Priority Data

Mar. 18, 1996 [JP] Japan .................................. 8-061033

[51] Int. Cl.[6] ........................... B29C 45/14; B29C 35/16
[52] U.S. Cl. ................. 264/261; 264/275; 264/DIG. 54
[58] Field of Search .................................. 264/250, 259, 264/261, 271.1, 275, 263, 328.16, DIG. 54

[56] References Cited

U.S. PATENT DOCUMENTS

| | | | |
|---|---|---|---|
| 3,971,128 | 7/1976 | Rebosio | 264/249 |
| 4,281,943 | 8/1981 | Viennot | 264/262 |
| 4,372,907 | 2/1983 | Herold et al. | 264/265 |
| 4,476,081 | 10/1984 | Kaczerginski et al. | 264/262 |
| 4,476,084 | 10/1984 | Takada et al. | 264/237 |
| 5,223,190 | 6/1993 | Vallauri et al. | 264/264 |
| 5,633,478 | 5/1997 | Ishino | 174/179 |

*Primary Examiner*—Angela Ortiz
*Attorney, Agent, or Firm*—Parkhurst & Wendel, L.L.P.

[57] ABSTRACT

The disclosed method of producing a composite insulator having a core portion, a sheath portion arranged on an outer surface of the core portion, and a plurality of shed portions projected from the sheath portion by using a die and heating the die, includes a step of cooling both end portions of the core portion. In the disclosed method, it is possible to provide a method in which cracks are not generated in the both end portions of the core portion during producing.

6 Claims, 6 Drawing Sheets

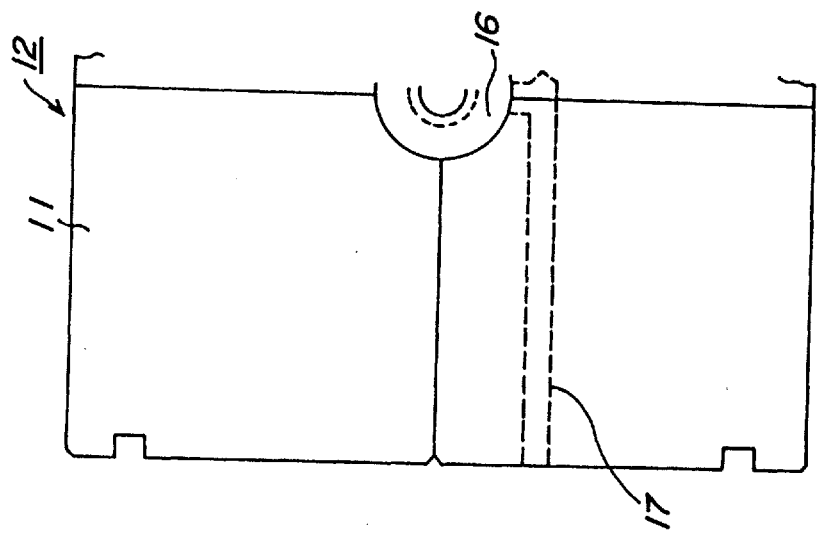
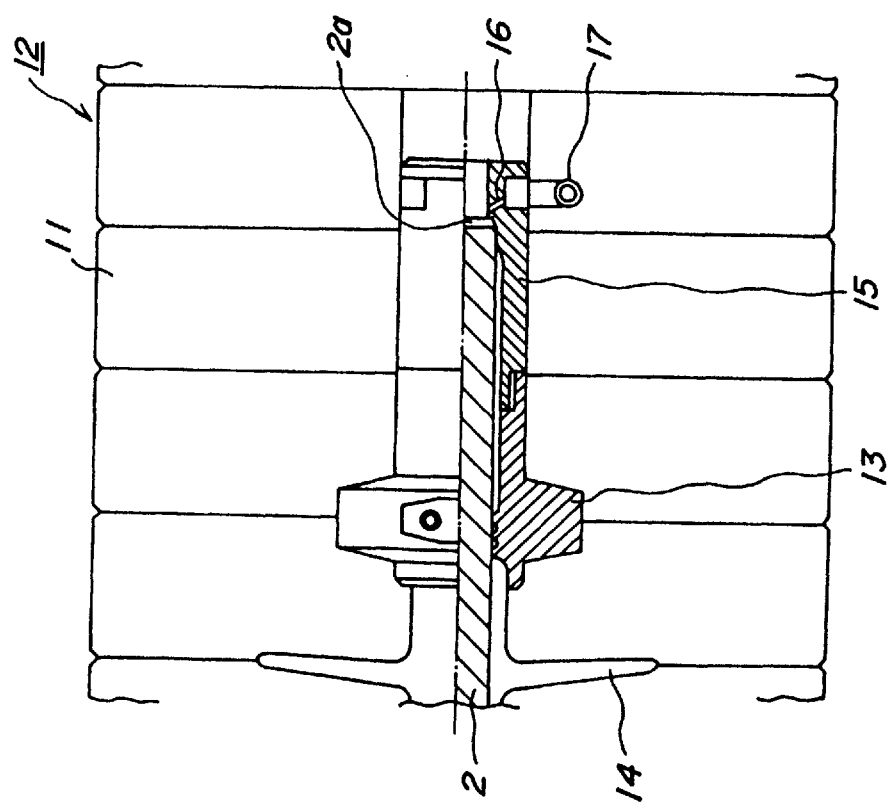

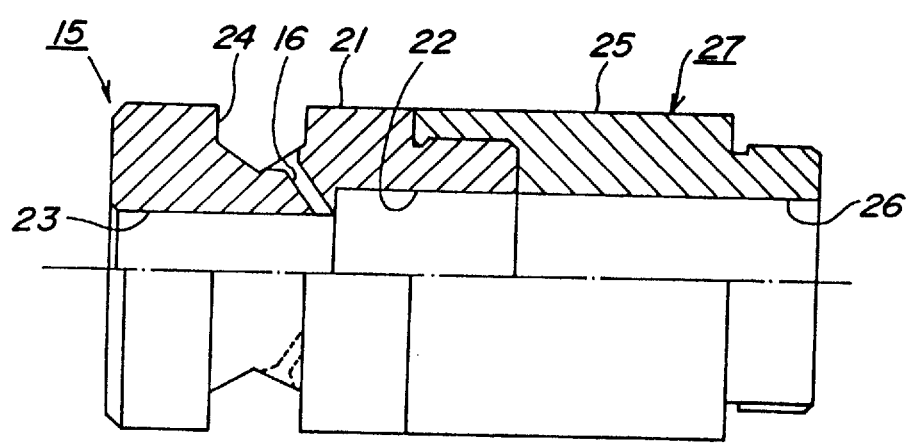
FIG_2

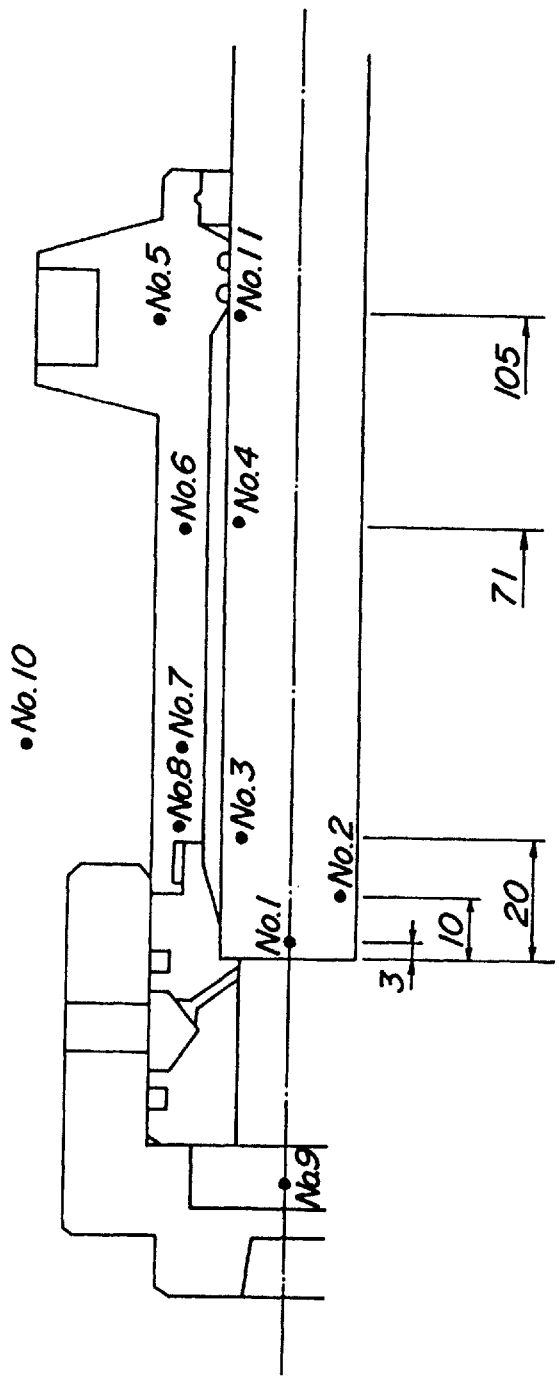

FIG_6
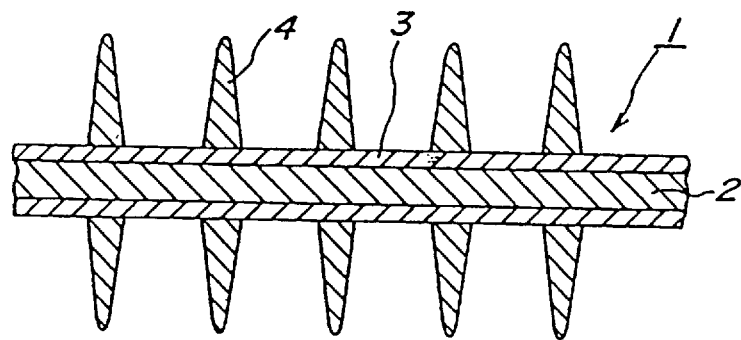
PRIOR ART

METHOD OF PRODUCING COMPOSITE INSULATOR

BACKGROUND OF THE INVENTION

(1) Field of the Invention

The present invention relates to an improvement of a method of producing a composite insulator comprising a core portion, a sheath portion arranged on an outer surface of the core portion, and shed portions projected from the sheath portion. It should be noted that in the present invention a term "composite insulator" means a wide concept including not only polymer insulators in which the core portion is made of an FRP rod but also polymer hollow insulators, hollow SP insulators, and so on in which the core portion is made of an FRP cylinder.

(2) Related Art Statement

FIG. 6 is a cross sectional view showing one embodiment of a polymer insulator which is one example of a composite insulator according to the invention. In the embodiment shown in FIG. 6, a polymer insulator 1 comprises an FRP rod 2, a sheath portion 3 arranged on an outer surface of the FRP rod 2, and a plurality of shed portions 4 projected from the sheath portion 3. As a method of producing such a polymer insulator 1, use is generally made of a compression molding method, a transfer molding method, and an injection molding method.

In the compression molding method, rubber materials are arranged on an outer surface of the FRP rod 2, the FRP rod 2 having rubber materials is set in a heated die pair, and the compression molding is performed to obtain the polymer insulator 1 having the sheath portion 3 and the shed portions 4 on the FRP rod 2. Moreover, in the transfer molding method, the FRP rod 2 is set in the die pair, non-cured rubber materials are introduced into a cavity of the die pair, and the non-cured rubber materials are cured by a heat applied to the die pair to obtain the polymer insulator 1 having the sheath portion 3 and the shed portions 4 on the FRP rod 2. In the injection molding method, the FRP rod 2 is set in the die pair heated to a curing temperature, and a preliminarily heated rubber materials are injected into a cavity of the die pair to obtain the polymer insulator 1 having the sheath portion 3 and the shed portions 4 on the FRP rod 2. In this case, a heating temperature of the die pair for curing is varied in accordance with a kind of rubber to be used, but it is about 170° C. for a general silicone rubber.

However, if the polymer insulator 1 is produced according to the compression molding method, the transfer molding method, and the injection molding method mentioned above, there arises a problem that cracks are generated on an end surface of the FRP rod 2 due to a high temperature received from the die pair during a molding operation in all the methods. This is because we think a curing temperature of elastomer materials such as silicone rubber or the like is higher than a transient temperature of epoxy resins which construct the FRP rod 2. Therefore, up to now, use is made of the FRP rod 2 having a length longer than a length of the polymer insulator 1, and both ends of the FRP rod 2 in which cracks are generated are cut out after the molding operation.

In this case, there arises a problem on a material loss and an unnecessary additional producing steps.

SUMMARY OF THE INVENTION

An object of the invention is to eliminate the drawbacks mentioned above and to provide a method of producing a composite insulator in which no cracks are generated in the both ends of the core portion during producing.

According to the invention, a method of producing a composite insulator having a core portion, a sheath portion arranged on an outer surface of said core portion, and a plurality of shed portions projected from said sheath portion by using a die and heating said die, comprises a step of cooling both end portions of said core portion.

In the present invention, since the both end portions of the core portion in which cracks are liable to be generated are cooled, no cracks are generated in the both end portions of the core portion during producing, and thus a material loss can be improved and an additional producing step can be reduced.

BRIEF DESCRIPTION OF THE DRAWINGS

FIGS. 1a and 1b are schematic views for respectively explaining a method of producing a composite insulator according to the invention;

FIG. 2 is a partial cross sectional view showing one embodiment of an end supporting portion according to the invention;

FIG. 3 is a schematic view illustrating temperature measuring points according to a example of the present invention and the comparative example;

FIG. 6 is a schematic view showing one embodiment of a polymer insulator which is one example of a composite insulator according to the invention.

DESCRIPTION OF THE PREFERRED EMBODIMENTS

Figure 4:
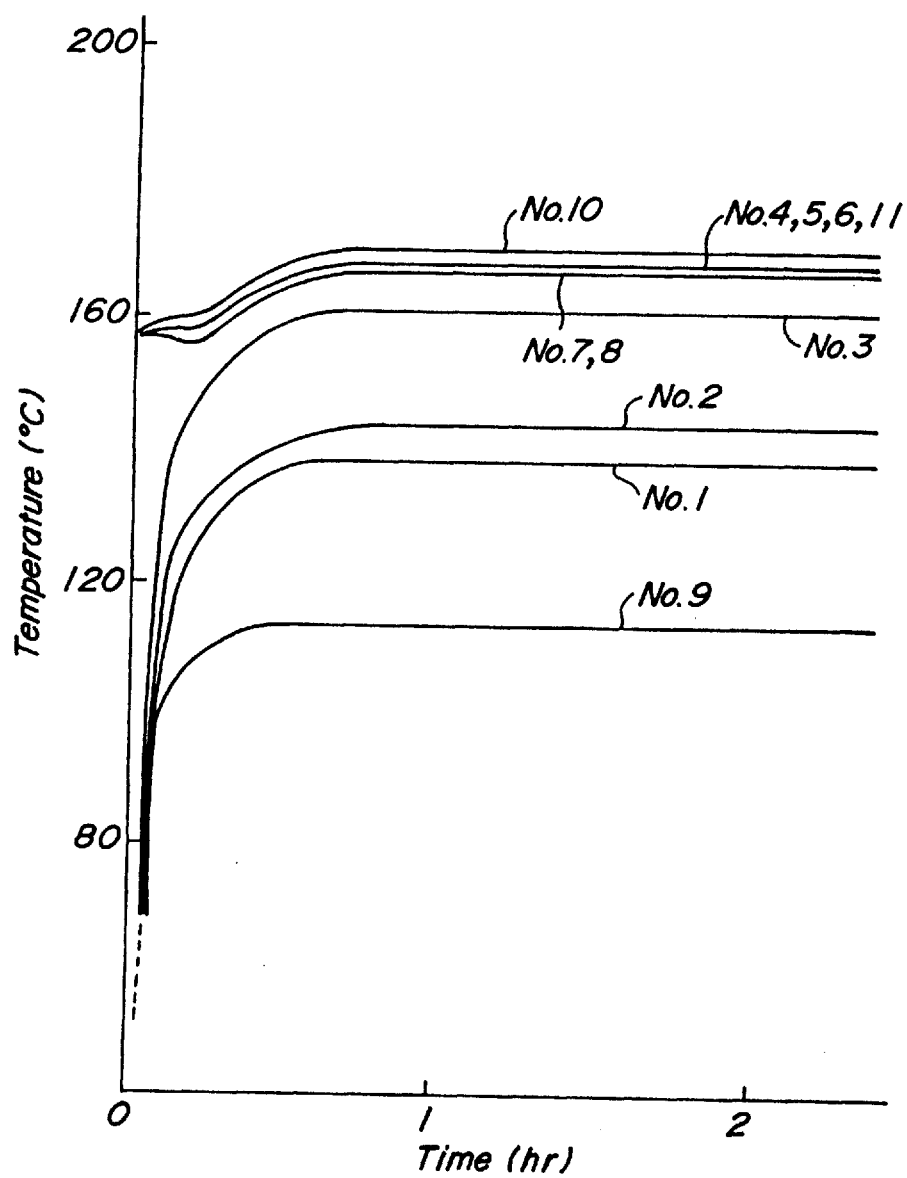
FIG. 4 is a graph showing a result of the example of the present invention.

FIGS. 1a and 1b are schematic views for respectively explaining one method of producing a composite insulator according to the invention. In FIG. 1a, an end portion of a polymer insulator is shown by a partial cross section, and, in FIG. 1b, a side portion of the polymer insulator is shown.

In the embodiment shown in FIGS. 1a and 1b, an example in which the polymer insulator 1 having a construction shown in FIG. 6 is produced by using the compression molding method is shown. In this embodiment, a plurality of segments 11 construct a pair of die 12 which is dividable up and down. Moreover, a ring 13 is arranged in the die 12 so as to fix and position the FRP rod 2 in the die 12. Under such a condition, rubber materials such as silicone rubber or the like are filled in a cavity 14 of the die 12 by the compression molding and are cured by heat to obtain the polymer insulator 1. The producing method mentioned above is the same as the known one.

An important point of the method of producing the composite insulator according to the invention is that an end supporting portion 15 having a heat insulated construction which is connected to the ring 13 is arranged at a position corresponding to an end portion 2a of the FRP rod 2, and a cooling nozzle 16 is arranged to the end supporting portion 15. Moreover, a pipe 17 for introducing air from outside to the cooling nozzle 16 is arranged in the die 12. Therefore, since air as a cooling media is introduced from outside through the pipe 17 and the cooling nozzle 16, it is possible to cool the end portion 2a of the FRP rod 2.

The embodiment mentioned above is one example of the invention, and the invention can be achieved if only the end portion 2a of the FRP rod 2 is cooled. For example, one most simple way is that the end portion 2a of the FRP rod 2 is projected from the die 12 in an open air. However, if the end portion 2a of the FRP rod 2 is cooled by using the end supporting portion 15 having a heat insulated construction, it is possible to prevent an insufficient cure of the sheath portion 3 due to a cooling of a portion of the sheath portion 3 connected to the FRP rod 2, and thus it is preferable.

Moreover, in the embodiment mentioned above, air is used as the cooling media, and the pipe 17 and the cooling nozzle 16 are arranged for introducing air to the end portion 2a of the FRP rod 2. However, it is possible to use a liquid as the cooling media by forming a liquid supply pass for introducing a liquid to the end portion 2a of the FRP rod 2 in the die 12 and the end supporting portion 15. Even in this case, the same effects as that of the previous embodiment using air as the cooling media can be obtained. However, in this case, the construction is more complicated as compared with the previous embodiment using air as the cooling media.

FIG. 2 is a partial cross sectional view showing one embodiment of the end supporting portion 15. In the embodiment shown in FIG. 2, the end supporting portion 15 made of a cylindrical member comprises an outer portion 21 connected to the die 12, a first inner portion 22 having a diameter through which the FRP rod 2 can be passed, and a second inner portion 23 having a diameter smaller than that of the first inner portion 22. Moreover, the end supporting portion 15 is made of a heat insulation material such as PEEK (polyether ether ketone) (PK-450, Japan Tripenko co. ltd.) or TEFLON (polytetrafluoroethylene) or the like.

In this embodiment, a recess 24 connected to the pipe 17 in the die 12 is arranged at an overall circumferential portion of a part of the outer portion 21. In the recess 24, four cooling nozzles 16 are arranged for generating an air flow toward the end portion 2a of the FRP rod 2 when the FRP rod 2 is set in the first inner portion 22. Moreover, in this embodiment, an extending member 27, having an outer portion 25 having the same outer diameter as that of the outer portion 21 and an inner portion 26 through which the FRP rod 2 can be passed, is arranged at one end of the end supporting portion 15. It is a matter of course that the extending member 27 is not necessary if the end supporting portion 15 has a sufficient length.

Actually, temperature variations at respective points from when rubber having a temperature of 170° C. was supplied into the cavity 14 were measured and compared with respect to the examples of the present invention having the construction shown in FIG. 1 and the examples of the comparative one in which the end supporting portion 15 was not used in the construction shown in FIG. 1. The points at which the temperature variations were measured were positions of No. 1–No. 11 shown in FIG. 3. In the comparative examples in which no end supporting portion 15 was used, the temperature variations of the die 12 corresponding to the above positions were measured. In all the cases, No. 9 shows a temperature of air and No. 10 shows a temperature in the die 12.

Figure 5:
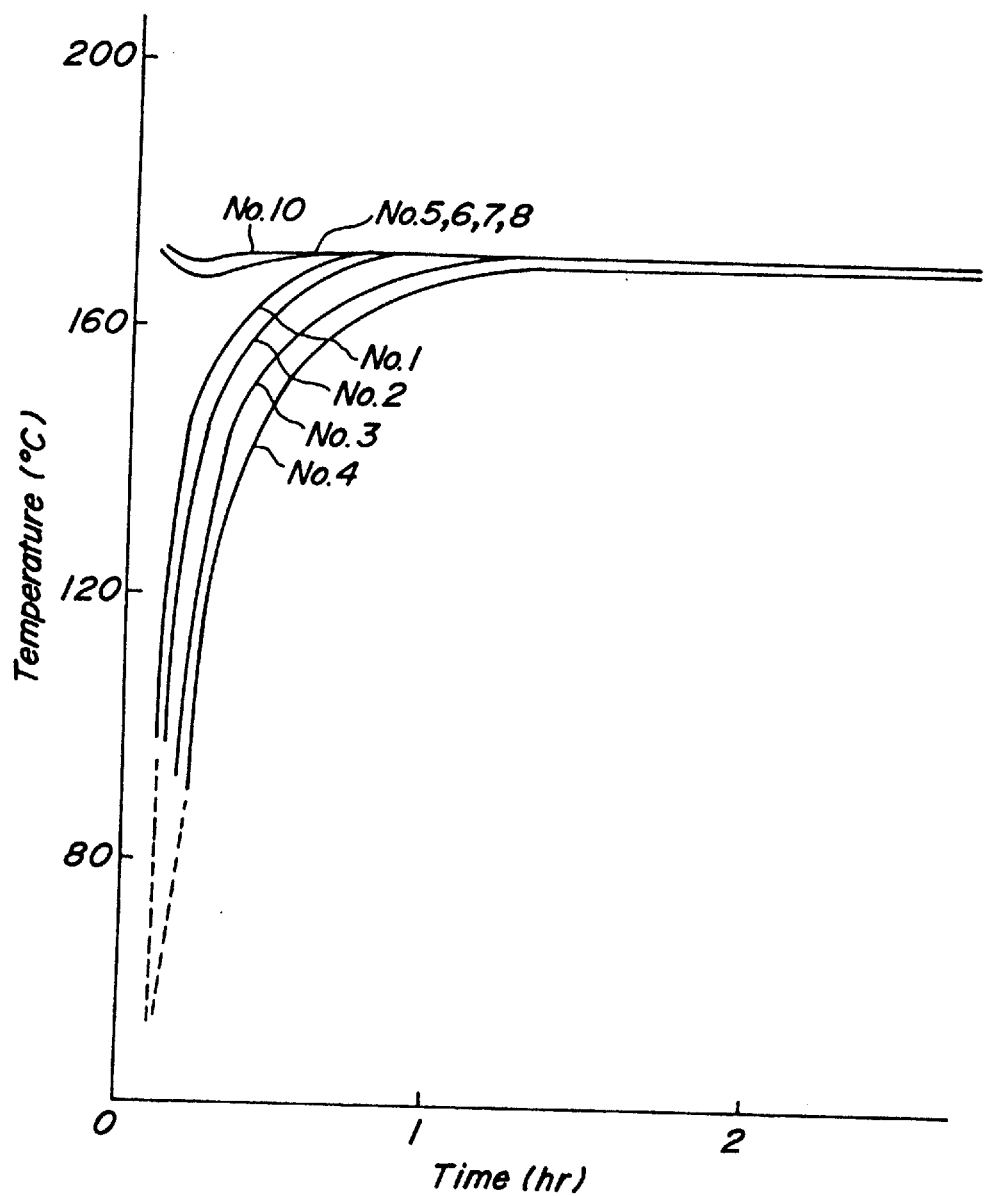
FIG. 5 is a graph illustrating a result of the comparative example.

The results of the examples of the invention are shown in FIG. 4, and the results of the examples of the comparative one are shown in FIG. 5. If compared FIG. 4 and FIG. 5, in the comparative examples, all the points show a same temperature after a lapse of time, but, in the examples of the present invention, the measuring points Nos. 1, 2, and 3 near the end portion 2a of the FRP rod 2 show a temperature respectively lower by 10° C. or more than that of the other measuring points after a lapse of time. In this comparison, a cooling effect can be recognized in the examples of the present invention. Moreover, in the examples of the present invention, the measuring points Nos. 5 and 11 remote from the end portion 2a of the FRP rod 2 show the same temperature as that of the die 12 after a lapse of time, and thus these points are not affected by cooling.

As mentioned above, according to the invention, since the both end portions of the core portion in which cracks are liable to be generated are cooled, no cracks are generated in the both end portions of the core portion during producing, and thus a material loss can be improved and an additional producing step can be reduced.

What is claimed:

1. A method of producing a composite insulator having a core portion, a sheath portion arranged on an outer surface of said core portion, and a plurality of shed portions projected from said sheath portion by using a die and heating said die, further comprising:

molding said sheath portion and said plurality of shed portions on said core portion, cooling both end portions of the core portion by a cooling means arranged in said end portion, said cooling reducing the temperature of both end portions of said core portion during molding of the plurality of shed portions and sheath portion.

2. The method of producing a composite insulator according to claim 1, wherein said method of molding said sheath portion and said shed portions on said core portion by using said die and heating said die is a compression molding method, a transfer molding method, or an injection molding method.

3. The method of producing a composite insulator according to claim 1, wherein said cooling step includes using an end supporting portion having a heat insulation construction is arranged at both end portions of said core portion in said die.

4. The method of producing a composite insulator according to claim 1, wherein air is used as a cooling media in said cooling means.

5. The method of producing a composite insulator according to claim 3, wherein said heat insulation is comprised of polytetrafluoroethylene.

6. The method of producing a composite insulator according to claim 3, wherein said heat insulation is comprised of polyether ether ketone.

* * * * *